United States Patent
Hassenpflug et al.

(10) Patent No.: US 10,215,860 B2
(45) Date of Patent: Feb. 26, 2019

(54) VEHICLE ENVIRONMENT SCANNING BY A PHASE-CONTROLLED LASER

(71) Applicant: Conti Temic microelectronic GmbH, Nuremberg (DE)

(72) Inventors: Christoph Hassenpflug, Lindau (DE); Stefan Hegemann, Wangen (DE)

(73) Assignee: Conti Temic microelectronics GmbH, Nuremberg (DE)

( * ) Notice: Subject to any disclaimer, the term of this patent is extended or adjusted under 35 U.S.C. 154(b) by 475 days.

(21) Appl. No.: 14/949,028

(22) Filed: Nov. 23, 2015

(65) Prior Publication Data

US 2016/0146941 A1    May 26, 2016

(30) Foreign Application Priority Data

Nov. 24, 2014   (DE) .................. 10 2014 223 900

(51) Int. Cl.
  *G01S 17/02*   (2006.01)
  *G01S 17/42*   (2006.01)
  (Continued)

(52) U.S. Cl.
  CPC .......... *G01S 17/936* (2013.01); *G01S 7/4815* (2013.01); *G01S 7/4817* (2013.01); *G01S 17/023* (2013.01); *G01S 17/42* (2013.01); *G01S 13/865* (2013.01); *G01S 13/867* (2013.01); *G01S 13/931* (2013.01); *G01S 2007/4977* (2013.01)

(58) Field of Classification Search
  CPC ........ G01S 17/93; G01S 17/936; G01S 17/04; G01S 7/4815; G01S 7/4817; G01S 13/865; G01S 13/867; G01S 13/931
  See application file for complete search history.

(56) References Cited

U.S. PATENT DOCUMENTS 5,013,151 A * 5/1991 Hughes ............... F41H 13/0062
                                                356/139.08
5,126,869 A * 6/1992 Lipchak ............... G01S 7/4811
                                                349/117
(Continued)

FOREIGN PATENT DOCUMENTS

DE    199 10 667    9/2000
DE    101 51 982    4/2003
(Continued)

OTHER PUBLICATIONS

German Search Report for German Patent Application No. 10 2014 223 900.1, dated Aug. 25, 2015, 8 pages, Muenchen, Germany, with English translation, 6 pages.
(Continued)

*Primary Examiner* — Eric L Bolda
(74) *Attorney, Agent, or Firm* — W. F. Fasse

(57) ABSTRACT

A driver assistance system (106) of a vehicle (100) includes a laser scanner (101) with a phase-controlled laser (102), a sensor unit (104) and an evaluation unit (103). The phase-controlled laser is configured to produce a controllable laser beam by beam forming and to direct the laser beam into an environment outside of the vehicle. The sensor unit (104) is configured to detect a retroreflection caused by the laser beam. The evaluation unit (103) produces driver assistance data by evaluating the detected retroreflection.

15 Claims, 5 Drawing Sheets

(51) Int. Cl.
   *G01S 17/93*    (2006.01)
   *G01S 7/481*    (2006.01)
   *G01S 7/497*    (2006.01)
   *G01S 13/86*    (2006.01)
   *G01S 13/93*    (2006.01)

(56) References Cited

U.S. PATENT DOCUMENTS

| | | | | |
|---|---|---|---|---|
| 5,253,033 | A * | 10/1993 | Lipchak | G01S 7/4811 250/203.2 |
| 6,085,151 | A * | 7/2000 | Farmer | G01S 7/023 342/70 |
| 6,856,919 | B1 | 2/2005 | Bastian et al. | |
| 2007/0159312 | A1 * | 7/2007 | Chen | B60Q 9/005 340/435 |
| 2007/0219720 | A1 * | 9/2007 | Trepagnier | B60W 30/00 701/300 |
| 2010/0176270 | A1 * | 7/2010 | Lau | B25J 9/1692 250/203.2 |
| 2013/0050156 | A1 * | 2/2013 | Rothaar | G02B 26/101 345/204 |
| 2013/0051655 | A1 * | 2/2013 | Collard | G01S 17/10 382/154 |
| 2015/0268331 | A1 * | 9/2015 | Koehler | G01S 17/026 356/5.01 |

FOREIGN PATENT DOCUMENTS

EP       1 792 775     6/2007
WO   WO 2012/112683   8/2012

OTHER PUBLICATIONS

Paul F. McManamon et al., "Optical Phased Array Technology", Proceedings of the IEEE, vol. 84, No. 2, Feb. 1996, pp. 268 to 298.

* cited by examiner

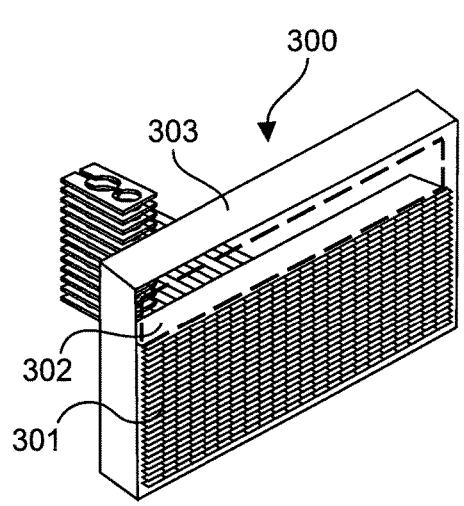 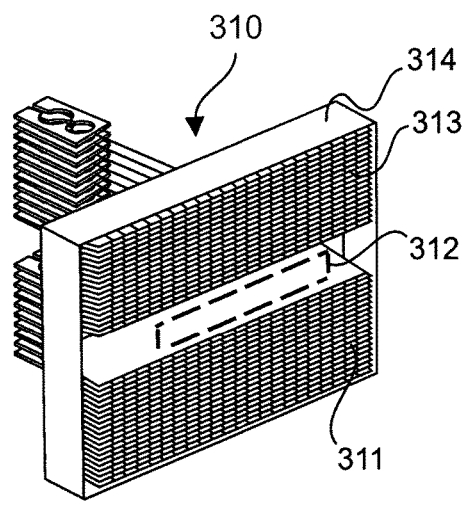
Fig. 3A　　　　　　　　　　Fig. 3B
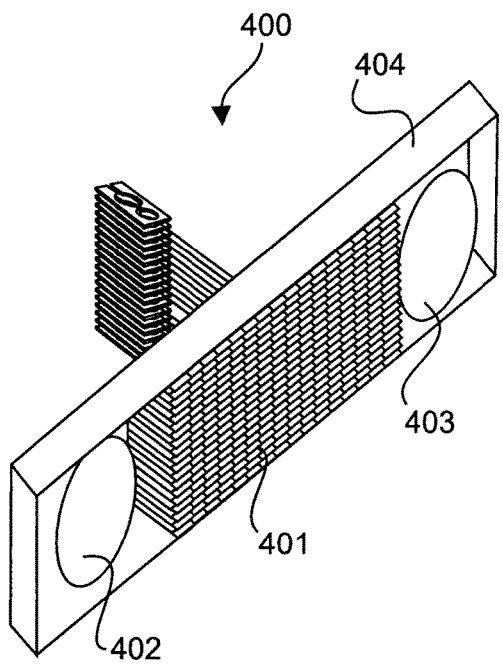 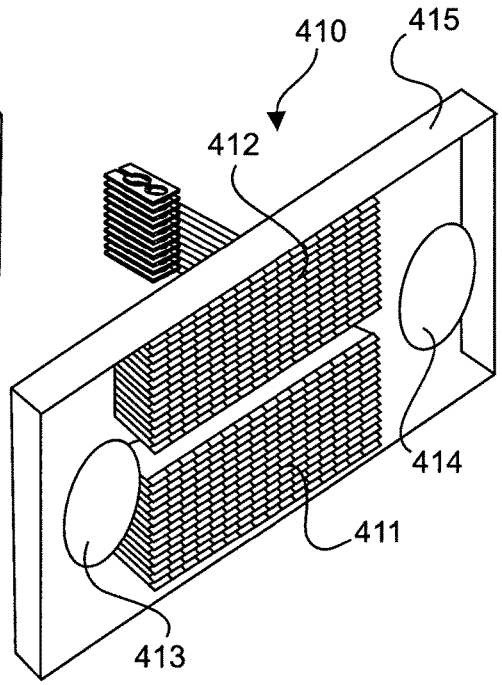
Fig. 4A　　　　　　　　　　Fig. 4B

VEHICLE ENVIRONMENT SCANNING BY A PHASE-CONTROLLED LASER

PRIORITY CLAIM

This application is based on and claims the foreign priority under 35 USC 119 of German Patent Application DE 10 2014 223 900.1 filed on Nov. 24, 2014, the entire disclosure of which is incorporated herein by reference.

FIELD OF THE INVENTION

The invention relates to the assistance of drivers of vehicles. In particular, the invention relates to a driver assistance system, a vehicle with a driver assistance system and the application of a phase-controlled laser for an environment laser of a vehicle.

BACKGROUND OF THE INVENTION

Modern vehicles can be equipped with so-called lidar sensors, which scan the vehicle environment by emitting laser beams and detecting and analyzing their reflections.

In present lidar sensors, on the one hand several lasers can be used, which are directed to different, fixedly defined regions in the environment. On the other hand, lidar systems can be equipped with mechanical apparatuses, which are designed to control the laser beam, for example a rotating mirror or a rotating prism.

SUMMARY OF THE INVENTION

In view of the above, it is an object of at least one embodiment of the invention to improve the assistance of drivers of vehicles and thus to increase road safety. At least one embodiment of the invention also aims to avoid or overcome the disadvantages of the prior art, and to achieve additional advantages, as apparent from the present specification. The attainment of these objects is, however, not a required limitation of the claimed invention.

The above objects can be achieved by at least one embodiment of the invention as disclosed herein.

A first aspect of the invention relates to a driver assistance system for a vehicle, which comprises a laser scanner, which includes a phase-controlled laser, a sensor unit and an evaluation unit. The phase-controlled laser is designed to produce a controllable and directed laser beam by means of beam forming. The sensor unit is designed to detect a retroreflection caused by the laser beam. Furthermore, the evaluation unit is designed to produce driver assistance data for the driver assistance system by evaluating the detected retroreflection.

In other words an underlying idea of an embodiment of the invention can be that a laser scanner is used to obtain driver assistance data, by controlling or directing its laser beam by beam forming, so that no movable components are necessary for the steering of the laser beam. In this way, on the one hand a laser scanner can be provided, which is less prone to defects and which has a reduced size. On the other hand, with the laser scanner according to the invention the environment of the vehicle can be scanned more flexibly and accurately, so that more precise information on the environment of the vehicle can be determined. This allows the driver of the vehicle to be better assisted. Moreover, the more flexible scanning of the environment by means of the laser scanner according to the invention permits the laser scanner to better cooperate with other sensor systems, such as for example with a camera and/or a radar system.

Within the context of the invention a driver assistance system can mean different types of electric installations, which serve to assist the driver. For example, the driver assistance system according to the invention can adopt the function of so-called adaptive cruise controls. However, the driver assistance system according to the invention can adopt also other functions, such as for example parking and maneuvering assistance and blind spot assistance. Further, the driver assistance system described in the context of the invention can be used for autonomous driving.

The vehicle can be for example a road vehicle, such as for example a motor vehicle, a passenger vehicle, a truck or a commercial vehicle. Further, the vehicle can also be a ship, such as for example a ferry, or an aircraft. Thus, the described driver assistance system can be used also for maneuvering ships (e.g. in harbors) or for steering aircrafts on the maneuvering area.

The laser scanner can be for example a so-called lidar, which comprises the phase-controlled laser described in the context of the invention. Thus, the laser scanner can be designed such that it scans or senses the environment of the vehicle by means of the phase-controlled laser. A phase-controlled laser can be a laser, where controlling or steering of the laser beam is effected by controlling the phases of the individual laser elements of the phase-controlled laser. By the phase control the individual phases of the individual laser elements can be controlled in such manner that the laser beam emitted by the phase-controlled laser can be formed by constructive and/or destructive interferences of the phases of the individual laser elements. That is that beam forming can mean the forming or steering of the laser beam emitted by the phase-controlled laser by means of phase control. Consequently, the phase-controlled laser must not comprise movable components for controlling or steering the laser beam. Phase-controlled lasers are known to the skilled person also under the name of "optical phased array". Further, beam forming can also mean a digital beam forming.

Digital beam forming can mean a method for adapting the radiation profile of an antenna to a predefined geometric contour. In radar devices a so-called phased array antenna can be used for this purpose. A phased array antenna can comprise several single beams, which can be activated differently (via a phase offset), making the orientation of the lobe electrically/digitally controllable. A phase-controlled laser thus can comprise several single radiators or laser elements, which can be activated differently, e.g. via a phase offset, making the orientation of the laser beam electrically/digitally controllable.

By providing a phase-controlled laser, which produces a controllable and directed laser beam by means of beam forming, the scanning rate of the laser scanner can be increased compared to a laser scanner with movable parts, as for example with a laser with a rotating mirror or prism the scanning rate is limited by the rotation of the mirror or prism. Thus, with the laser scanner according to the invention also the quality of the sensor results and hence the assistance of the driver can be improved. Moreover, it is also possible to flexibly direct the laser beams into different directions. Further, the beam forming can be performed both in 2D and also in 3D. This enables to achieve for example a high scanning resolution, which includes for example 64 scan lines.

The laser scanner can also comprise means for focusing or modifying the focus point of the laser beam. For example, the laser scanner can comprise lens systems. Adaptation of the focus point of the laser beam can for example be used to prevent the laser scanner from freezing during winter. For this purpose, for example the focus point of the laser beam can be guided to the cover of the phase-controlled laser, making the snow or ice layer on the phase-controlled laser melt.

The sensor unit can mean a sensor unit, which can detect retroreflections caused by the laser beam. Here, the retroreflections can refer to different types of retroreflections. For example, the sensor unit can be designed to detect reflections of the laser beam. The sensor unit can, however, also be designed to detect other retroreflections caused by the laser beam, e.g. infrared rays, ultraviolet rays and/or terahertz rays, which can be caused by the laser beam.

The evaluation unit of the laser scanner can also refer to a calculating unit or processor of the laser scanner, which is designed to evaluate the data detected by the sensor unit. Here, the evaluation unit can be integrated into the sensor unit or can be separate from the sensor unit. For example, the evaluation unit can be part of the electronic system of the sensor unit. Further, the phase-controlled laser, the sensor unit and the evaluation unit can be integrated into a component. This means that it is not necessary that the mentioned units are separate from each other.

The produced driver assistance data can mean data, which can be used for assistance of the driver or for autonomous driving. For example, the driver assistance data can include environment data. The environment data in turn can include information on other road users, the road, other objects and/or other information, which are connected to the environment of the vehicle.

In accordance with an exemplary embodiment of the invention the laser scanner is designed to scan a vehicle environment with the produced laser beam. Scanning can mean here that the laser beam is directed to different points of the vehicle environment. Consequently, the vehicle environment can be scanned with the produced laser beam. These points of the vehicle environment can be defined according to a specific scan sequence. However, the points can also be selected by accident according to a predefined random distribution. Consequently, the points can be distributed over a certain surface or over a certain volume.

In this way, information on a certain region, i.e. a certain surface and/or a certain volume can be obtained.

According to a further exemplary embodiment of the invention the laser scanner is designed to scan the vehicle environment at a scanning speed, a scanning resolution, a scanning range and/or a scanning angle range. Here, the scanning speed, the scanning resolution, the scanning range and/or the scanning angle range are dependent on the vehicle speed.

The scanning speed can mean the number of scanned points of the vehicle environment per time unit. Further, the scanning speed can mean the motion speed or the swiveling speed of the laser beam. The scanning resolution can refer to the number of scanned points of the vehicle environment per surface unit or volume unit. In other words, the scanning resolution can mean the density of the scanned points. The scanning range can refer to the maximum distance of the scanned points of the vehicle environment and the scanning angle range can define which angle is scanned by the laser scanner. For example at a low vehicle speed the scanning speed can be high, the scanning resolution can be low, the scanning range can be small and/or the angle range can be large. At a high vehicle speed the scanning speed in the far range can be low, the scanning resolution in the far range can be high, the scanning range can be large and/or the angle range can be small. Further, it is also possible that the laser scanner can be designed to limit the scanning angle in the vertical direction depending on the speed. For example, the elevation angle or scanning angle in the vertical direction can be larger in the close range than in the far range. In horizontal or lateral direction the angle range in the close range can be e.g. approx. 170° and in the far range approx. 10°, wherein under "approximately" it can be understood that the respective value can deviate 10% from the indicated value. The scanning rate can be e.g. approx. 15 Hz and the scanning resolution can be approx. 0.125°

In this way scanning of the vehicle environment can be adapted to the vehicle speed. In general, scanning or the scan behavior can be adapted to the currently required function of the driver assistance system. For example the scanned region can be adapted to the road course. Thus, the driver assistance system can comprise for instance a so-called magic carpet function, which scans the road surface.

Further, the scanning speed of the sensor can be adapted to the traffic situation. For example, points which are close to the vehicle can be scanned more often than points which are farther away from the vehicle. This allows the driver assistance system to quickly react to events, which occur in the vicinity of the vehicle.

By adapting the angle range the driver assistance system or the laser scanner can guide the scan region into the direction of the road and reduce it to a smaller surface when driving slowly or in parking scenarios. Thus, the resolution of the laser scanner can be increased. At a higher speed the same laser scanner can increase the scanning range, i.e. can direct the view into the distance. Thus, the same laser scanner can be used both for parking functions and for adaptive cruise controls (ACC or AEB) or also for highly automated driving.

According to a further exemplary embodiment of the invention the scanning resolution in a close range of the vehicle environment is lower than in a far range of the vehicle environment.

Depending on the function or mode of the driver assistance system the close range and the far range can be different. In the ACC-mode (adaptive cruise control) the close range can for instance refer to regions of the vehicle environment, which are at maximum 100 m away from the vehicle and the far range can refer to regions of the vehicle environment, which are more than 100 m away from the vehicle. In the parking assistant mode the close range can for instance refer to regions of the vehicle environment, which are at maximum 5 m away from the vehicle and the far range can refer to regions of the vehicle environment, which are more than 5 m away from the vehicle. Averaged over all functions of the driver assistance system the close range can for instance refer to regions of the vehicle environment, which are at maximum 50 m away from the vehicle and the far range can refer to regions of the vehicle environment, which are more than 50 m away from the vehicle.

In this way, the close range can be quickly scanned so that a quick reaction on potential events is possible. On the other hand, the far range can be scanned in such manner that also far away objects, which seem to be small, can be recognized.

According to a further exemplary embodiment of the invention a scanned region of the vehicle environment is dependent on the vehicle speed in such manner that the scanned region is larger at a higher vehicle speed than at a lower vehicle speed.

This can mean that the scanned surface or the scanned volume is larger at a higher speed of the vehicle than at a lower speed of the vehicle. For example, the higher speed can refer to a speed, which is higher than 20 km/h, whereas the lower speed can refer to a speed, which is lower than 20 km/h. As described above, in this way the driver assistance system can adopt different functions at different vehicle speeds, for example at low speeds the function of parking sensors and at high speeds the function of adaptive cruise controls.

According to a further aspect of the invention the laser scanner is designed such that it scans the vehicle environment with horizontal scanning motions, vertical scanning motions, sinusoidal scanning motions, meandering scanning motions and/or randomly distributed scan points. Scanning motions can mean here the movements of the laser beam, which are performed by beam forming. This means that no mechanically movable components must be used for the scanning motions.

In this way, the vehicle environment can be scanned uniformly and/or according to the function or task. For example, the sinusoidal scanning motion can be used to detect adjacent or laterally arranged vehicles.

According to a further exemplary embodiment of the invention the driver assistance system comprises a camera for recording images of the vehicle environment, the camera having a camera resolution. Further, the laser scanner is designed to scan the vehicle environment recorded by the camera with a scanning resolution that corresponds to the camera resolution.

The camera can be for example a mono or stereo camera, which can record images in the visible and/or infrared region. Camera resolution can mean the density of the recorded image points. Scanning resolution can also mean the density of the points scanned by the laser of the vehicle environment.

Due to the fact that both the data of the camera and the data of the laser scanner can be recorded with the same resolution, these data can be processed with the same evaluation unit. In this way it is not necessary that the driver assistance system comprises two redundant evaluation units for evaluating the camera data and the laser scanner data.

In general, the scanning behavior of the laser scanner and the signal processing steps of another vehicle sensor can be adapted to each other. In this way, already in the early signal processing the data of the laser scanner and the data of another vehicle sensor, for example the camera, can be fused. Based on the same resolution of the data both data can be processed with the same evaluation unit. Thus, redundant signal processing steps can be saved and simultaneously the information content of the fused sensor data can be increased.

According to a further exemplary embodiment of the invention the driver assistance system comprises a radar sensor and/or a camera, wherein the laser scanner and the radar sensor or the laser scanner and the camera are integrated in a sensor unit. Further, the evaluation unit of the laser scanner is designed to process data detected by the radar sensor or the camera to produce the driver assistance data.

In other words, the laser scanner and the radar sensor or the laser scanner and the camera can be integrated into the same structural unit. This means that the laser scanner and the radar senor or the camera together form a sensor, which can detect different types of data. Thus, by the evaluation unit the sensor data of the laser scanner and the radar sensor or the camera can be fused. Further, the data of the laser scanner and the radar sensor or camera can be processed by the same evaluation unit.

By the beam forming the radiation characteristics of the laser can be adapted to the recording region or angle region of the camera, e.g. to a fish-eye objective or to surround view systems.

In this way, a driver assistance system with a highly integrated environment sensor can be provided, which comprises both a laser scanner and a radar sensor or a camera. Further, it is not necessary to provide redundant evaluation units, as the evaluation unit of the laser scanner processes both the data detected by the laser scanner and by the radar sensor or camera.

A further aspect of the invention relates to a vehicle with a driver assistance system, which is described in the context of the invention.

The vehicle can be a road vehicle, a motor vehicle, a passenger vehicle, a truck and/or a commercial vehicle. Further, the vehicle can also be a ship, for example a ferry, or an aircraft. Thus, the driver assistance system can be used for example for maneuvering ships (e.g. in harbors) or for steering aircrafts on the maneuvering area.

A further aspect of the invention relates to the use of a phase-controlled laser for an environment sensor of a vehicle.

Here, the phase-controlled laser can comprise the features and/or advantages described in the context of the invention.

Further features, advantages and application possibilities of the invention will be apparent from the ensuing description of the embodiments and the drawings. All described and/or illustrated features alone or in any combination form the subject-matter of embodiments of the invention also independent of their composition in the individual claims or their references.

BRIEF DESCRIPTION OF THE DRAWINGS

In order that the invention may be clearly understood, it will now be described in connection with example embodiments thereof, with reference to the accompanying drawings, wherein:

FIGS. 3A and 3B each show a laser scanner according to an embodiment of the invention.

FIGS. 4A and 4B each show a laser scanner according to an embodiment of the invention.

The drawings are merely schematic and not to scale. Identical reference numerals in different figures denote identical or similar elements. Identical or similar elements can also be denoted by different reference numerals.

DETAILED DESCRIPTION OF EXAMPLE EMBODIMENTS INCLUDING THE PREFERRED EMBODIMENTS OF THE INVENTION

Figure 1:
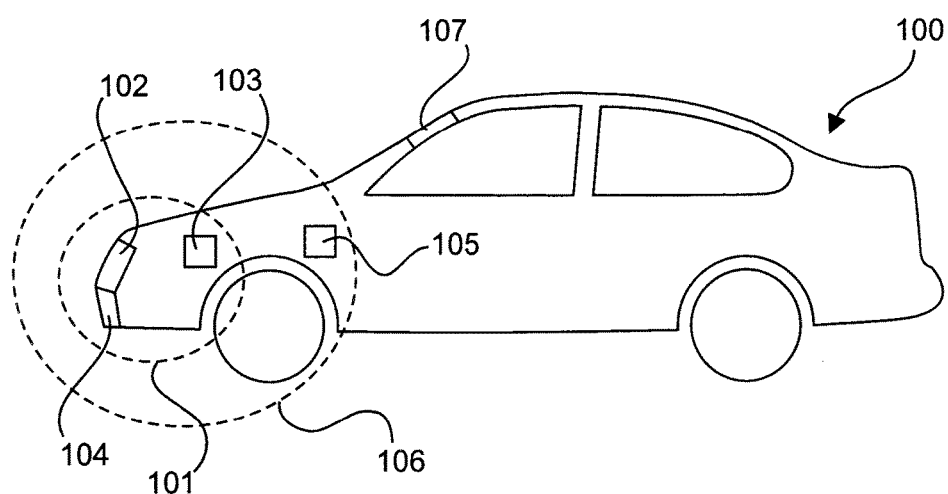
FIG. 1 shows a vehicle with a driver assistance system according to an embodiment of the invention.

FIG. 1 shows a vehicle 100 with a driver assistance system 106 according to an embodiment of the invention. The driver assistance system 106 comprises a laser scanner 101. Further, the driver assistance system 106 can comprise also further components, for example a navigation system 105. The laser scanner 101 comprises a phase-controlled laser 102, an evaluation unit 103 and a sensor unit 104. In this embodiment it is shown that the laser scanner is arranged in the region of the radiator grill of the vehicle 100. However, the laser scanner 101 can also be arranged at the position 107, i.e. at the windshield in the region of the central rearview mirror.

The phase-controlled laser 102 is designed to produce a controllable and directed laser beam by means of beam forming. The sensor unit 104 is designed to detect a retroreflection caused by the laser beam and the evaluation unit 103 is designed to produce driver assistance data for the driver assistance system 106 by evaluating the detected retroreflection.

Figure 2:
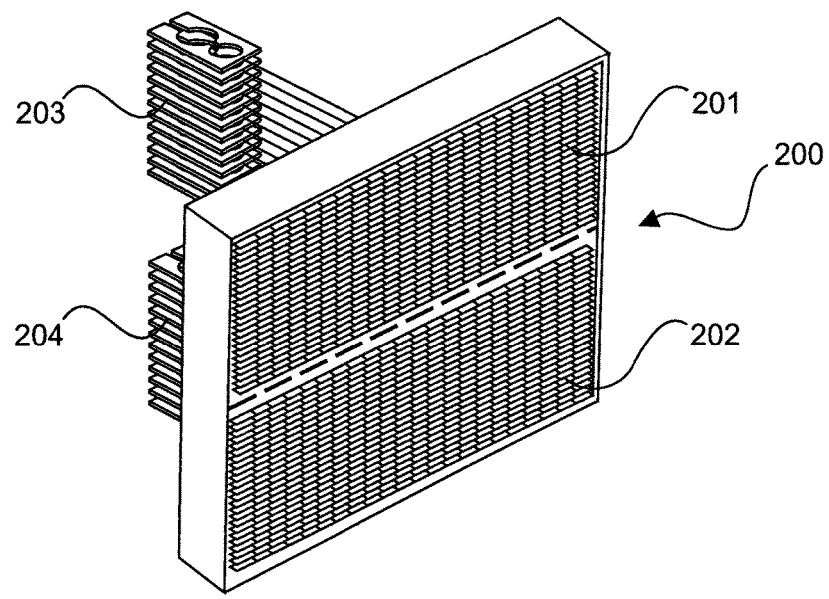
FIG. 2 shows a laser scanner according to an embodiment of the invention.

FIG. 2 shows a laser scanner 200 of a driver assistance system according to an embodiment of the invention. The laser scanner 200 comprises a phase-controlled laser 202, which can simultaneously comprise also a sensor unit. This means that the sensor unit is integrated in the phase-controlled laser 202. Alternatively, the sensor unit can also be a separately arranged unit. The laser scanner 202 comprises an electronic system 204, which activates the phase-controlled laser 202 for beam forming to produce the controllable and directed laser beam.

In the laser scanner furthermore a radar sensor 201 is integrated, which is also designed to produce a controllable and directed radar beam by means of beam forming. For this purpose, the radar sensor 201 also comprises an appropriate electronic system 203. In other words, in FIG. 2 a so-called LiRa-sensor is shown, which represents a combination of a lidar and a radar sensor. This LiRa-sensor can be arranged for example in a spoiler or behind the windscreen of the vehicle. By the digital beam forming the LiRa can have a small installation space, so it is can be used in multiple ways.

By means of the laser scanner 202 for example defined regions can be selectively checked, in which the radar sensor 201 has already recognized objects. Further, the phase-controlled laser 202 could selectively determine a width of objects, which have been detected by means of the radar sensor 201. This means that the object is scanned in one level and that the width or lateral positions can be confirmed and further also an object height can be determined. Further, the phase-controlled laser 202 can also recognize or measure more precisely bridges or tunnel entrances and other objects able to underpass.

FIG. 3A shows a laser scanner 300 of a driver assistance system according to an embodiment of the invention. The laser scanner 300 comprises a phase-controlled laser 301 and a mono camera 302, which are integrated in a housing 303. By means of the phase-controlled laser 301 for example objects, which have been detected by the camera 302, can be examined more precisely. In this way, a sensor fusion of the data of the camera 302 and of the phase-controlled laser 301 can be performed.

FIG. 3B also shows a laser scanner 310, where a phase-controlled laser 311, a mono camera 312 and a radar sensor 313 are integrated in a housing 314.

In general, the advantage of the integrated sensor described in this application can be that the different sensors have access to the same hardware, so that a raw data fusion can be realized.

FIG. 4A shows a laser scanner 400, which comprises a phase-controlled laser 401 and a stereo camera with two cameras 402 and 403, which are arranged in a housing 404. Here, the cameras 402 and 403 are arranged at a distance from each other to record stereo images, the phased-controlled laser 401 being arranged between the two cameras 402 and 403.

FIG. 4B also shows a laser scanner 410 of a driver assistance system according to an embodiment of the invention, which comprises a phase-controlled laser 411, a radar sensor 412 and a stereo camera with two cameras 413 and 414, which are all integrated in a housing 415. The laser scanners shown in FIGS. 3B and 4B can combine or fuse three different sensor data (lidar data, radar data and camera data).

The two to three sensors shown and described in the context of the invention can be provided and installed as one box or two box system. For example, the data can be detected in one box, i.e. at a place (for example in the region of the radiator grill), and processed in another box, for example at a region of the vehicle which can be better cooled. In this way, the computationally intensive signal processing can be positioned at a cooler place with more space.

Figure 5A:
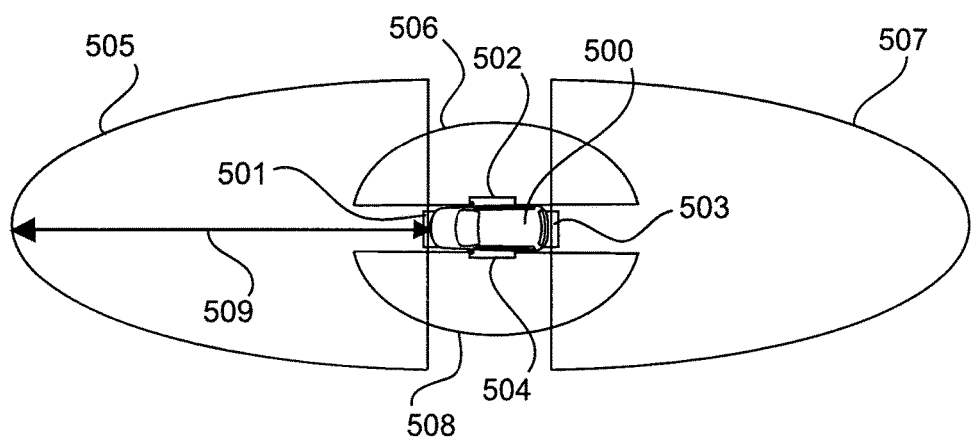
FIGS. 5A and 5B each show a vehicle with a driver assistance system according to an embodiment of the invention.
Figure 5B:
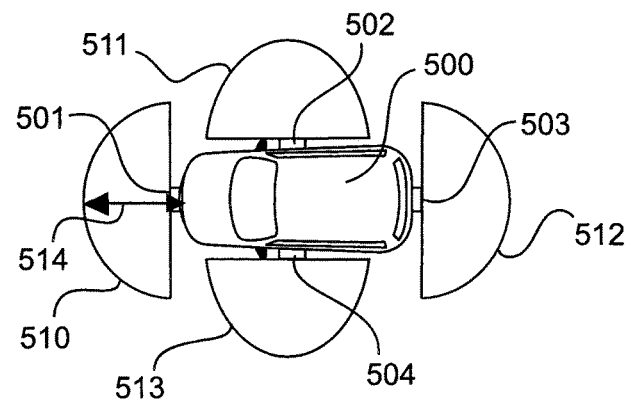

FIGS. 5A and 5B each show a vehicle 500 with a driver assistance system according to an embodiment of the invention. The driver assistance system comprises four laser scanners 501, 502, 503 and 504. The laser scanner 501 is arranged at the front, the laser scanner 502 at the right side, the laser scanner 503 at the rear end and the laser scanner 504 at the left side of the vehicle 500. In this way, nearly the entire environment of the vehicle can be scanned.

FIG. 5A shows scan regions 505, 506, 507 and 508 of the laser scanners 501, 502, 503 and 504 at a higher speed of the vehicle, for example at a speed higher than 20 km/h. At higher speeds of the vehicle the scanned regions 505 to 508 can be larger than at lower speeds of the vehicle 500. For example, the scanning range 509 of the front scanned region 505 can be higher than at lower speeds. For example the scanned range 509 is more than 100 m.

FIG. 5B shows the scanned regions 510, 511, 512 and 513 at lower speeds of the vehicle 500, for example when the vehicle 500 has a speed below 20 km/h. In this case, the scanning range of the front scan region 514 can be at maximum 10 m, the scanning resolution in the scanned regions 510, 511, 512 and 513 being higher.

Figure 6:
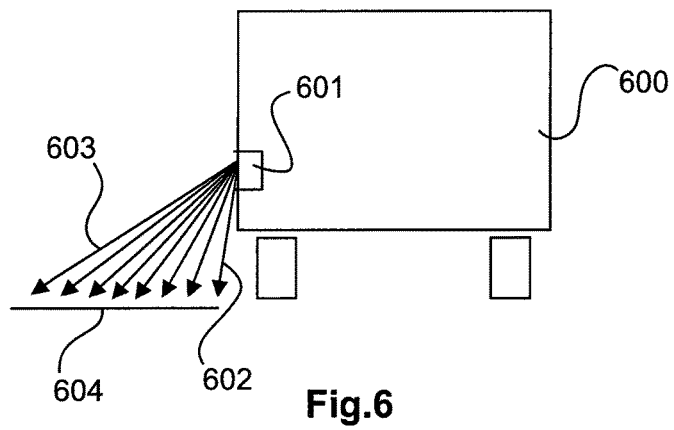
FIG. 6 shows a vehicle with a driver assistance system according to an embodiment of the invention.

FIG. 6 shows a vehicle with a driver assistance system according to an embodiment of the invention, which comprises a laser scanner 601 arranged laterally. Here, the laser scanner is designed to guide the laser beam over the road surface 604, so that for example a roadside can be determined by scanning the road surface. The laser beams can comprise for example laser beams 602, which scan a region close to the vehicle, and laser beams 603, which scan a region 603 farther away from the vehicle 600.

FIGS. 7A, 7B, 7C and 7D show different scanning motions of a phase-controlled laser of a driver assistance system according to an embodiment of the invention.

Figure 7A:
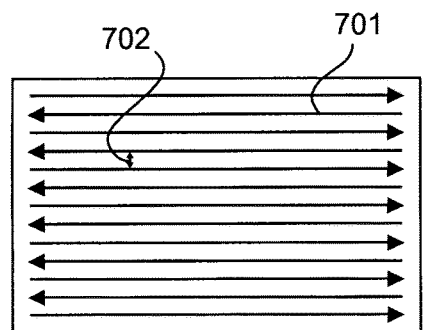
FIGS. 7A to 7D show scanning motions or scanned points of a phase-controlled laser of a driver assistance system according to an embodiment of the invention.
Figure 7B:
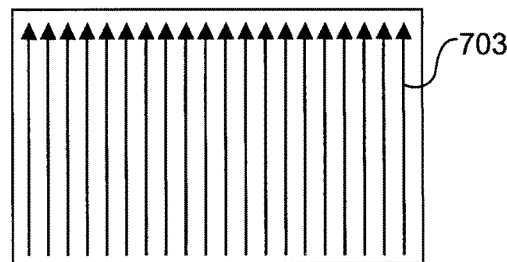
Figure 7C:
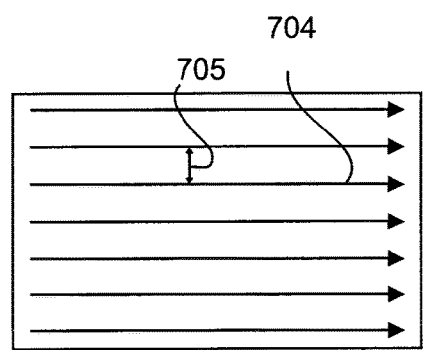

FIG. 7A shows a scanned region 700, where horizontal scanning motions 701 are performed, wherein the distance between two adjacent horizontal scanning motions 702 is relatively small (compared to FIG. 7C). FIG. 7B shows a scanned region 700, where vertical scanning motions 703 are performed. FIG. 7C shows a scanned region 700, which also comprises horizontal scanning motions, wherein the distance between two scanning motions 705 is relatively high compared to the scanning motions shown in FIG. 7A. For example, the scanning motions shown in FIG. 7A can correspond to the scanning motions at high vehicle speeds and the scanning motions shown in FIG. 7C can correspond to scanning motions at lower vehicle speeds.

Figure 7D:
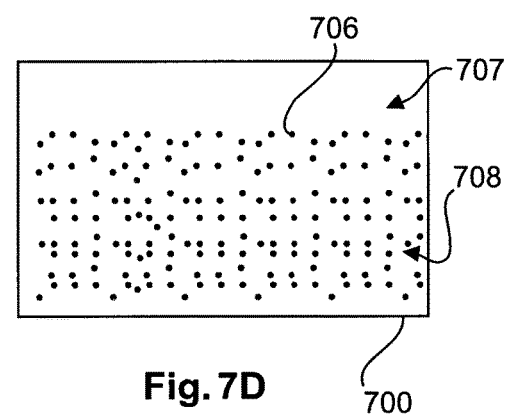

FIG. 7D shows randomly distributed scanned points 706, wherein the scanned points in the lower region 708 have a higher density than in the upper region 707 of the scanned region 700. For example, this distribution of the scanned points can be used for the scanning of a lateral region of the vehicle environment. In this way, the height of adjacent vehicles can be scanned in more detailed manner.

Figure 8:
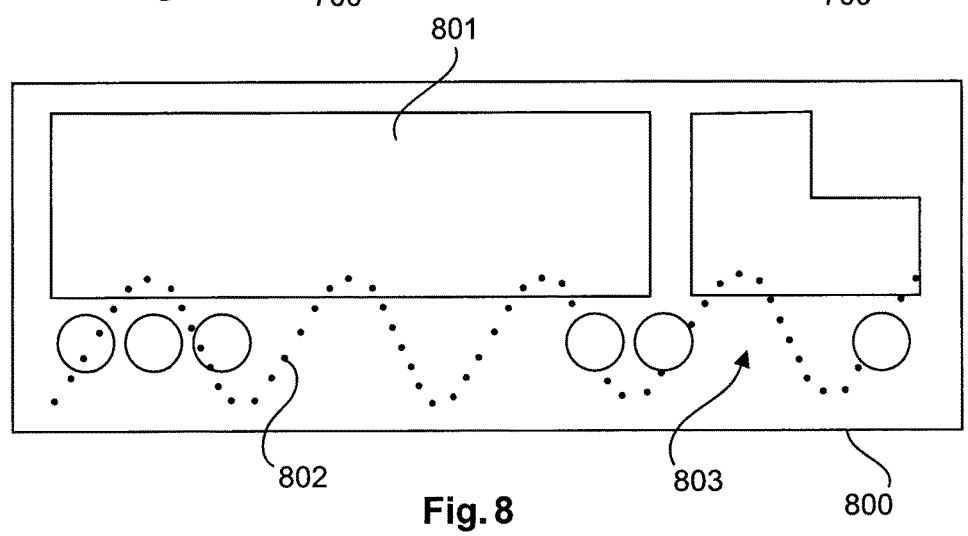
FIG. 8 shows scanning motions or scanned points of a phase-controlled scanner of a driver assistance system according to an embodiment of the invention.

FIG. 8 shows also a scanned region 800 of a phase-controlled scanner of a driver assistance system according to an embodiment of the invention, wherein sinusoidal scanning motions 802 are performed. In this way, for example a lateral region of the vehicle environment can be scanned, so that adjacent vehicles 801 can be reliably recognized. In this way, it is prevented that the laser scanner does erroneously not recognize an adjacent vehicle 801, since it is directed into the space between road and underbody of the vehicle 803. This means that an advantage of the sinusoidal scanning is that the laser is not erroneously directed under a trailer of a semitrailer or through spaces of guard rails. A more precise accuracy can be achieved e.g. by several sinusoidal scanning motions displaced relative to each other.

Figure 9:
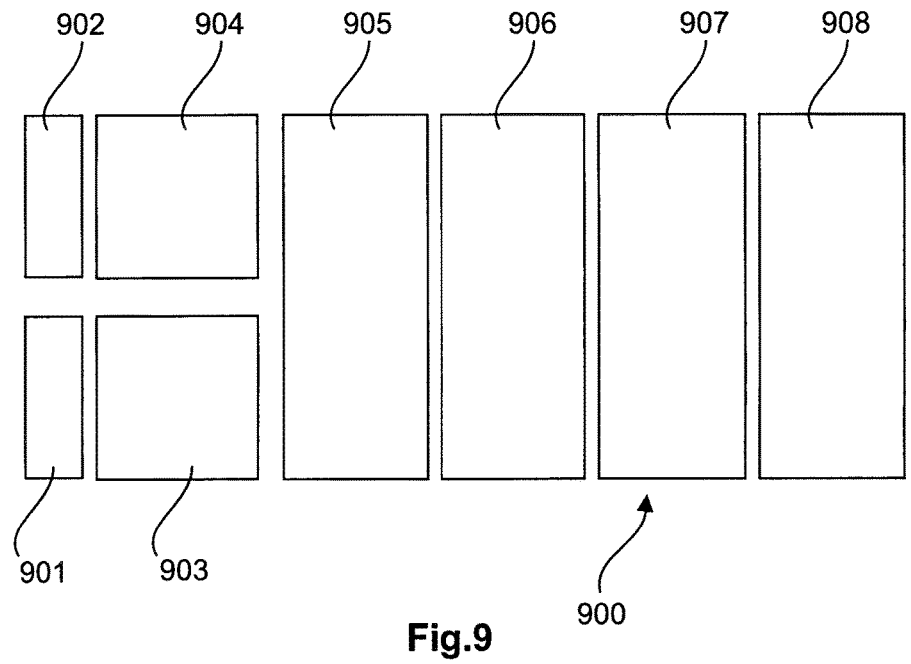
FIG. 9 shows a laser scanner of a driver assistance system according to an embodiment of the invention.

FIG. 9 shows a laser scanner 900 of a driver assistance system according to an embodiment of the invention. The laser scanner 900 comprises a phase-controlled laser 901 and a stereo camera 902. The elements 903, 904, 905, 906, 907 and 908 are part of an evaluation unit of the laser scanner. The evaluation unit comprises a camera-point-cloud-generation unit 904, which generates a 3D-point cloud from the raw data of the stereo camera 902. The evaluation unit comprises also a laser-point-cloud-generation unit 903, which generates a 3D-point cloud from the reflections of the laser 901. These 3D-point clouds of the camera data and the laser data can be processed together in a stixel-fusion unit 905, in which the raw data of the units 903 and 904 are fused and a common data representation is created. This can be e.g. in form of "stixels", which can mean combined point clouds, which have similar properties (e.g. the same position in the room, etc.). Subsequently, the data can be processed in a cluster-formation-unit 906, in which a further step, e.g. cluster formation, is performed between raw data and object data. Further, in the object-formation-unit 907 the object formation from the stixels or the cluster takes place. The interface 908 forms the interface of the objects to the function, which then in turn activates the actors. An advantage of this construction is that as of the unit 905 the signal processing is independent from the sensor.

Figure 10:
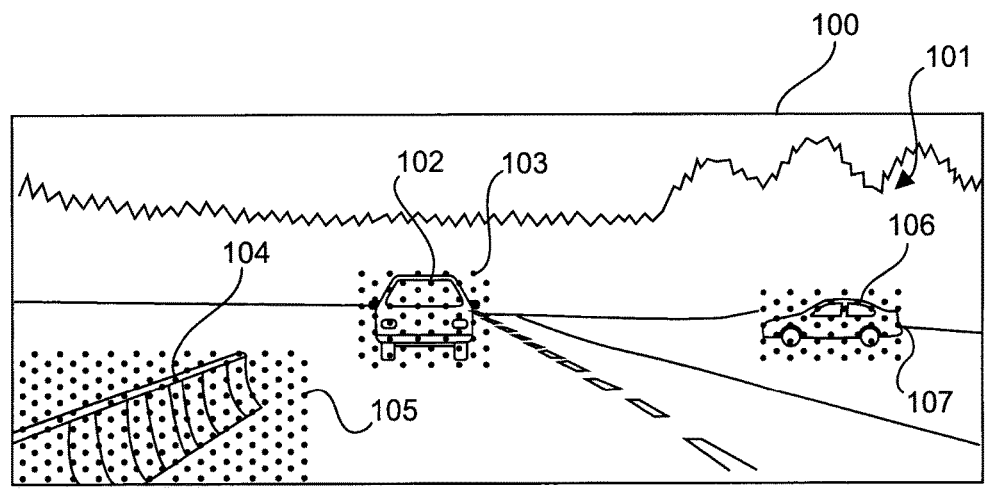
FIG. 10 shows a vehicle environment with scanned points of a phase-controlled laser of a driver assistance system according to an embodiment of the invention.

FIG. 10 shows scanned points of a laser scanner of a driver assistance system according to an embodiment of the invention. Here, a vehicle environment 100 is shown, which comprises a vehicle 102 in front, a lateral boundary 104 and a further vehicle 106 driving on another road.

The driver assistance system comprises for example a laser scanner, which comprises an integrated camera and/or an integrated radar sensor, which can roughly recognize the lateral boundary 104, the vehicle 102 in front and the other vehicle 106. The regions, in which the lateral boundary 104, the vehicle 102 in front and the other vehicle 106 are located, are scanned by means of the laser scanner to determine further or more detailed information. Thus, in the region of the lateral boundary 104 there are scanned points 105, in the region of the vehicle 102 in front there are scanned points 103 and in the region of the further vehicle 106 there are scanned points 107. Thus, by means of the laser scanner further information, for example dimensions of the vehicles 102 and 106 and a distance to the lateral boundary 104 can be determined.

This means that with the combination of different sensor data further information can be obtained.

In addition, it is pointed out that "including" and "comprising" do not exclude other elements, and the word "a" does not exclude a plurality. Further, it is pointed out that features, which were described with reference to any one of the above exemplary embodiments, can be used also combined with other features of any other exemplary embodiments described above. Reference numerals in the claims are not to be considered as restrictions.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A driver assistance system for a vehicle, comprising:
    a laser scanner comprising a phase-controlled laser, a sensor unit and an evaluation unit;
    wherein the phase-controlled laser is configured to produce a controllable and directed laser beam by phase-control beam-forming;
    wherein the phase-controlled laser comprises plural laser radiators configured to respectively produce individual beams respectively having different phases to cause constructive and/or destructive interference among the individual beams and thereby produce, control and direct the laser beam by the phase-control beam-forming;
    wherein the laser scanner is configured to scan a vehicle environment outside of the vehicle with the laser beam by controlling and directing the laser beam by the phase-control beam-forming;
    wherein the sensor unit is configured to detect a retroreflection from the vehicle environment caused by the laser beam; and
    wherein the evaluation unit is configured to produce driver assistance data for the driver assistance system by evaluating the detected retroreflection.

2. The driver assistance system according to claim 1, wherein the laser scanner is configured to scan the vehicle environment with at least one scanning parameter of the laser scanner selected from a scanning speed, a scanning resolution, a scanning range and/or a scanning angle range; and
    wherein the at least one scanning parameter is or are dependent on a vehicle speed of the vehicle.

3. The driver assistance system according to claim 2, wherein the at least one scanning parameter comprises the scanning resolution; and
    wherein the scanning resolution in a close range of the vehicle environment is lower than in a far range of the vehicle environment.

4. The driver assistance system according to claim 1, wherein a scanned region of the vehicle environment that is scanned with the laser beam is dependent on a vehicle speed of the vehicle such that the scanned region is larger at a lower vehicle speed than at a higher vehicle speed.

5. The driver assistance system according to claim 1, wherein the laser scanner is configured to scan the vehicle environment with the laser beam being controlled and directed to carry out horizontal scanning motions and/or vertical scanning motions.

6. A vehicle comprising a driver assistance system according to claim 1 installed in a motor vehicle.

7. The driver assistance system according to claim 1, wherein the laser scanner does not include any movable components that move for performing the controlling and the directing of the laser beam.

8. The driver assistance system according to claim 1, wherein the laser scanner is configured to scan the vehicle environment with the laser beam being controlled and directed to carry out sinusoidal scanning motions or meandering scanning motions.

9. A driver assistance system for a vehicle, comprising:
a camera having a camera resolution; and
a laser scanner comprising a phase-controlled laser, a sensor unit and an evaluation unit;
wherein:
the phase-controlled laser is configured to produce a controllable and directed laser beam by phase-control beam-forming;
the laser scanner is configured to scan a vehicle environment outside of the vehicle with the laser beam by controlling and directing the laser beam by the phase-control beam-forming;
the sensor unit is configured to detect a retroreflection from the vehicle environment caused by the laser beam;
the evaluation unit is configured to produce driver assistance data for the driver assistance system by evaluating the detected retroreflection;
the camera is configured and arranged to record images, at the camera resolution, of the vehicle environment outside of the vehicle; and
the laser scanner is configured to scan the vehicle environment with a scanning resolution that corresponds to the camera resolution.

10. A driver assistance system for a vehicle, comprising:
a radar sensor and/or a camera; and
a laser scanner comprising a phase-controlled laser, a sensor unit and an evaluation unit;
wherein:
the phase-controlled laser is configured to produce a controllable and directed laser beam by phase-control beam-forming;
the laser scanner is configured to scan a vehicle environment outside of the vehicle with the laser beam by controlling and directing the laser beam by the phase-control beam-forming;
the sensor unit is configured to detect a retroreflection from the vehicle environment caused by the laser beam;
the laser scanner and the radar sensor, or the laser scanner and the camera, are integrated in a sensor unit; and
the evaluation unit is configured to produce driver assistance data for the driver assistance system by evaluating the detected retroreflection and by processing data detected by the radar sensor or the camera.

11. A method of using a laser scanner including a phase-controlled laser for a driver assistance system of a motor vehicle, comprising:
with the phase-controlled laser, producing a controllable laser beam by phase-control beam-forming, and directing the laser beam into a vehicle environment outside the vehicle;
with the laser scanner, scanning the laser beam in the vehicle environment by controlling and directing the laser beam by the phase-control beam-forming, wherein the phase-controlled laser comprises plural laser radiators, and wherein the phase-control beam-forming comprises with the plural laser radiators respectively producing individual beams respectively having different phases to cause constructive and/or destructive interference among the individual beams and thereby produce, control and direct the laser beam;
with a sensor unit, detecting a retroreflection caused by the laser beam reflecting from an object in the vehicle environment; and
with an evaluation unit, producing driver assistance data for the driver assistance system by evaluating the detected retroreflection.

12. A driver assistance system for a vehicle, comprising:
a laser scanner comprising a phase-controlled laser, a sensor unit and an evaluation unit;
wherein:
the phase-controlled laser is configured to produce a controllable and directed laser beam by phase-control beam-forming;
the laser scanner is configured to scan a vehicle environment outside of the vehicle with the laser beam by controlling and directing the laser beam by the phase-control beam-forming to carry out randomly distributed scan points;
the sensor unit is configured to detect a retroreflection from the vehicle environment caused by the laser beam; and
the evaluation unit is configured to produce driver assistance data for the driver assistance system by evaluating the detected retroreflection.

13. A method for a driver assistance system of a motor vehicle, comprising:
with a phase-controlled laser of a laser scanner, producing a controllable laser beam by phase-control beam-forming, and directing the laser beam into a vehicle environment outside the vehicle;
with a camera having a camera resolution, recording images, at the camera resolution, of the vehicle environment;
with the laser scanner, scanning the laser beam in the vehicle environment with a scanning resolution that corresponds to the camera resolution, by controlling and directing the laser beam by the phase-control beam-forming;
with a sensor unit, detecting a retroreflection caused by the laser beam reflecting from an object in the vehicle environment; and
with an evaluation unit, producing driver assistance data for the driver assistance system by evaluating the detected retroreflection.

14. A method for a driver assistance system of a motor vehicle, wherein:
the driver assistance system has a laser scanner and further has a radar sensor and/or a camera,
the laser scanner includes a phase-controlled laser,
the laser scanner and the radar sensor, and/or the laser scanner and the camera, are integrated in a sensor unit, and the method comprises:

with the phase-controlled laser, producing a controllable laser beam by phase-control beam-forming, and directing the laser beam into a vehicle environment outside the vehicle;

with the laser scanner, scanning the laser beam in the vehicle environment by controlling and directing the laser beam by the phase-control beam-forming;

with a laser sensor, detecting a retroreflection caused by the laser beam reflecting from an object in the vehicle environment; and with an evaluation unit, producing driver assistance data for the driver assistance system by evaluating the detected retroreflection and by processing data detected by the radar sensor and/or the camera.

15. A method of using a laser scanner including a phase-controlled laser for a driver assistance system of a motor vehicle, comprising:

with the phase-controlled laser, producing a controllable laser beam by phase-control beam-forming, and directing the laser beam into a vehicle environment outside the vehicle;

with the laser scanner, scanning the laser beam in the vehicle environment by controlling and directing the laser beam by the phase-control beam-forming to carry out randomly distributed scan points;

with a sensor unit, detecting a retroreflection caused by the laser beam reflecting from an object in the vehicle environment; and with an evaluation unit, producing driver assistance data for the driver assistance system by evaluating the detected retroreflection.

* * * * *